(12) United States Patent
Schildmann et al.

(10) Patent No.: US 9,752,074 B2
(45) Date of Patent: *Sep. 5, 2017

(54) CHROMIUM-FREE PICKLE FOR PLASTIC SURFACES

(71) Applicant: Enthone Inc., West Haven, CT (US)

(72) Inventors: Mark Peter Schildmann, Solingen (DE); Ulrich Prinz, Solingen (DE); Christoph Werner, Düsseldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/702,020

(22) Filed: May 1, 2015

(65) Prior Publication Data

US 2016/0024381 A1  Jan. 28, 2016

Related U.S. Application Data

(63) Continuation of application No. 12/672,980, filed as application No. PCT/US2008/072779 on Aug. 11, 2008, now Pat. No. 9,023,228.

(30) Foreign Application Priority Data

Aug. 10, 2007  (EP) .................................... 70158126

(51) Int. Cl.
| | | |
|---|---|---|
| C03C 15/00 | (2006.01) |
| C03C 25/68 | (2006.01) |
| H01L 21/302 | (2006.01) |
| H01L 21/461 | (2006.01) |
| H01L 21/311 | (2006.01) |
| C09K 13/00 | (2006.01) |
| C09K 13/04 | (2006.01) |
| B44C 1/22 | (2006.01) |
| C08J 7/14 | (2006.01) |
| C23C 18/24 | (2006.01) |

(52) U.S. Cl.
CPC ............. *C09K 13/04* (2013.01); *B44C 1/227* (2013.01); *C08J 7/14* (2013.01); *C23C 18/24* (2013.01); *C08J 2355/02* (2013.01)

(58) Field of Classification Search
None
See application file for complete search history.

(56) References Cited

U.S. PATENT DOCUMENTS

| | | |
|---|---|---|
| 3,653,947 A | 4/1972 | Kandler et al. |
| 4,853,095 A | 8/1989 | D'Ambrisi |
| 5,669,978 A | 9/1997 | Brown |
| 6,861,097 B1 | 3/2005 | Goosey et al. |
| 7,578,947 B2 | 8/2009 | Schildmann et al. |
| 2007/0099425 A1 | 5/2007 | Schildmann et al. |

OTHER PUBLICATIONS

International Search Report, PCT/US08/72779, dated Nov. 3, 2008, 4 pages.
International Search Report, PCT/US08/72779, dated Nov. 3, 2008, 5 pages.
Lee et al., "Electrochemical Oxidation of Mn2+ on Boron-Doped Diamond Electrodes with B13+ Used as an Electron Transfer Mediator", Journal of The Electrochemical Society, 2004, vol. 151, No. 8, pp. E265-E270, <http://www.postech.ac.kr/chem/echem/pubs/04-8-JES.pdf>.
International Preliminary Report on Patentability, PCT/US08/72779, dated Feb. 25, 2010, 6 pages.

*Primary Examiner* — Stephanie Duclair
(74) *Attorney, Agent, or Firm* — Carmody Torrance Sandak & Hennessey LLP

(57) ABSTRACT

A pickling solution for the surface pre-treatment of plastic surfaces in preparation for metallization, the solution comprising a source of Mn(VII) ions; and an inorganic acid; wherein the pickling solution is substantially free of chromium (VI) ions, alkali ions, and alkaline-earth ions.

20 Claims, No Drawings

# CHROMIUM-FREE PICKLE FOR PLASTIC SURFACES

CROSS-REFERENCE TO RELATED APPLICATIONS

This application is a continuation of U.S. patent application Ser. No. 12/672,980, filed Aug. 12, 2010, which issued as U.S. Pat. No. 9,023,228 on May 5, 2015 and which is a national stage application of PCT/US08/72779, filed Aug. 11, 2008, each of which is incorporated herein by reference in its entirety.

FIELD OF THE INVENTION

The present invention relates to a pickling solution and to a process for pickling plastic surfaces. In particular, the present invention relates to a pickling solution and to a pickling process for pickling ABS plastic surfaces or ABS polymer blend surfaces prior to a subsequent metallization of these surfaces.

BACKGROUND OF THE INVENTION

Plastic surfaces are frequently coated with suitable metal layers either for technical reasons or for decorative reasons. In the case of technically reasoned coatings the same can be applied for instance for forming electrically conducting structures on the plastic surfaces. If the coating is applied for decorative reasons, plastic surfaces having a high quality appearance will be produced in this way. Especially in the field of automotive construction decoratively metalized plastic surfaces are widely spread. In the domain of electronic and electrical engineering conductive structures are deposited for instance on plastic boards for forming integrated circuits by means of suitable metal deposition processes.

For the durability of the metal layers deposited on the plastic surfaces it is decisive that the same exhibit sufficient adhesion on the plastic surfaces. To provide for a corresponding adhering strength, it is the common practice in prior art to roughen the plastic surfaces prior to a corresponding metal deposition, in order to be able to provide for a sufficient adhering strength of the deposited metal layers. For this purpose different processes are known from prior art. Typically, plastic surfaces are treated with chromium (VI) containing pickling solutions. Such solutions which are based on chromium-sulfuric acid can include for instance chromium(VI) oxide and sulfuric acid at a weight ratio of 1:1.

At the immersion of the plastic surface into such chromium acid pickling solution the polybutadiene component on the plastic surface will oxidatively decompose and leave cavities on the surface, which serve as corresponding anchoring structures for the deposited metal layers. It is assumed that the adhesion is produced by this anchoring effect.

On the other hand, chromium(VI) containing compounds are suspected of being cancer-causing, so that dealing with these compounds is subject to strict environmental regulations. In the face of the potential danger caused by chromium(VI) releasing compounds, a prohibition of the industrial use of chromium(VI) containing compounds cannot be excluded.

An alternative for the mentioned chromium(VI) containing pickling solutions for plastic surfaces are pickling solutions based on alkali permanganates. For this purpose, pickling solutions based on alkali permanganates, preferably potassium permanganate, and a mineral acid like for instance phosphoric acid are used.

The pickling solutions thus prepared are free of chromium (VI) containing compounds and exhibit a good pickling effect for plastic surfaces, especially plastic surfaces from ABS plastic.

Alkali permanganate-based pickling solutions typically contain up to 20 g/l of alkali permanganate in a corresponding mineral acid solution such as a 40 to 85% phosphoric acid.

However, the alkali permanganate which is used is subject to a rapid self-decomposition, so that the pickling effect of a freshly prepared alkali permanganate pickling solution will be insufficient already after several hours. As a decomposition product of the alkali permanganates colloidal manganese(IV) compounds are apparently produced which neither allow filtering nor centrifuging. The pickling solution which has lost its pickling effect can be re-sharpened by the addition of alkali permanganate. During this however, the colloidal manganese(IV) decomposition products, manganese(II) ions as well as the alkali ions become even more enriched within the pickling solution. As a result of this enrichment the viscosity of the pickling solution will be increased up to a point where the pickling solution must be discarded, because satisfying pickling results cannot be achieved any longer.

A further drawback of the described alkali permanganate pickling solutions is the colloidal appearance of the decomposition products. Since these decomposition products, as described above, can neither be filtered nor centrifuged, these colloidal manganese(IV) compounds are frequently spread over the entire coating process of the plastic surfaces.

But this spreading may lead to a strong influence on the deposition process, so that metal layers are finally deposited which are faulty or otherwise insufficient.

SUMMARY OF THE INVENTION

It is therefore an object of the present invention to provide a chromium-free pickling solution for plastic surfaces which is able to overcome the problems known from prior art in connection with the use of alkali permanganate pickling solutions. It is also an object of the present invention to provide a suitable process for pickling plastic surfaces, especially surfaces of ABS plastic and ABS blends.

DETAILED DESCRIPTION OF PREFERRED EMBODIMENTS

This application claims priority to European application 07015812.6, the entire disclosure of which is expressly incorporated herein by reference.

Concerning the pickling solution, this object is solved by a pickling solution for the surface pre-treatment of plastic surfaces, including Mn(VII) ions as well as an organic acid, characterized in that the pickling solution is free of alkali and alkaline-earth ions.

As an inorganic acid the pickling solution in accordance with the invention includes an acid from the group consisting of phosphoric acid, peroxomonophosphoric acid, peroxodiphosphoric acid, sulfuric acid, peroxomonosulfuric acid or peroxodisulfuric acid. In one embodiment of the invention also a mixture of at least two of the above-mentioned acids can be used.

The concentration of the Mn(VII) ions contained in the pickling solution is according to the invention within a range between 0.001 and 0.5 mol/l. Here, the concentration of the inorganic acid from the mentioned group can amount between 1 and 18.5 mol/l.

In addition to the Mn(VII) ions the pickling solution according to the invention can include further ions for supporting the pickling process. For this purpose silver, bismuth, vanadium, molybdenum, lead or copper ions or mixtures thereof are particularly suited. The concentration of these further ions can be within a range between 0.001 and 2 mol/l, preferably between 0.001 and 0.01 mol/l. The addition of such further ions increases the efficiency and supports the formation of aggressive etching active substances, for which the brown colour of the pickling solution is characteristic.

Moreover, the pickling solution according to the invention can include further additives such as wetting agents or defoamers.

The Mn(VII) ions contained in the pickling solution are obtained in accordance with the invention by means of an anodic oxidation inside an oxidation cell from a solution which includes Mn ions of a lower oxidation stage than (VII). The Mn ion containing solution is produced by dissolving or dispersing a suitable manganese salt in an acid solution. Suitable manganese(II) salts are for instance $MnCO_3$, $MnSO_4$, $MnO$, $MnCl_2$, $Mn(CH_3COO)_2$ and $Mn(NO_3)_2$ or mixtures thereof. Suitable manganese(III) salts are for instance $Mn_2O_3$, $MnPO_4$, $MnO(OH)$, $Mn(CH_3COO)_3$ and $MnF_3$ or mixtures thereof. A suitable Mn(IV) salt is for instance $MnO_2$.

As an acid the acidic solution used for the oxidative production of Mn(VII) ions includes an acid from the group consisting of phosphoric acid, peroxomonophosphoric acid, peroxodiphosphoric acid, sulfuric acid, peroxomonosulfuric acid or peroxodisulfuric acid. In an advantageous embodiment of the invention the acid used in the solution for the oxidative production of Mn(VII) ions corresponds to the acid which is contained in the pickling solution. In one embodiment of the invention also a mixture of at least two of the above-mentioned acids can be used.

The production of $Mn^{7+}$ as well as the pickling process according to the invention can take place inside an oxidation cell. The oxidation cell which is used for this purpose includes an anode space and a cathode space which are separated from each other through a diaphragm or a membrane correspondingly allowing ions to pass through. As an anode mixed oxide electrodes are suited such as an iridium/ruthenium mixed oxide coated titanium electrode for instance. As an alternative also diamond coated niobium anodes, anodes from massive platinum or platinum-plated anodes are suitable. The anode material which is used must exhibit a sufficiently high oxygen overvoltage for allowing an oxidation of Mn ions of a lower oxidation stage into Mn(VII). On the other hand, the oxygen overvoltage of anode material must be low enough to avoid the formation of peroxomonosulphate, peroxidisulphate, and $H_2O_2$. As a cathode material corrosion-resistant electrodes, for instance such consisting of stainless steel or graphite are suitable. A precondition for the employed cathode material is that the same is resistant to the acid contained in the catolyte.

The anolyte can consist of a concentrated acid and a Mn ion releasing compound dissolved therein. A suitable anolyte solution consists for instance of 0.1 to 0.3 mol/l manganese carbonate in 85% phosphoric acid.

In accordance with the invention, the catolyte can consist of a correspondingly diluted mineral acid such as for instance 50% phosphoric acid solution. By applying a current density of 0.1 to 100 $A/dm^2$, preferably 1 to 50 $A/dm^2$ and even more preferably 2 to 25 $A/dm^2$, Mn(VII) ions are galvanically oxidatively formed.

For the oxidative formation of Mn(VII) ions an anode surface of 0.01 to 3 $dm^2$, preferably 0.1 to 3 $dm^2$ per liter of the anolyte turned out as suitable. The anodic oxidation can advantageously be increased in its efficiency by applying a reverse pulse current.

The pickling solution thus formed in the anolyte exhibits a sufficient permanganese concentration in order to pickle plastic surfaces such as for instance surfaces of ABS plastic or ABS blends. As possible counter ions of the permanganese ions present in the pickling solution, the pickling solution itself merely contains $H^+$ and $Mn^{2+}$ ions.

The pickling solution according to the invention preserves its pickling effect also at an increased temperature such as e.g. 50° C. for many days, which fact is indicative of a high stability of the pickling solution. On the other hand, alkali permanganese pickling solutions completely lose their pickling effect within 24 hours. The working temperature of the inventive pickling solution can be in the range of between about 20° C. and about 90° C., with a preferred range between about 55° C. and about 80° C.

It can be assumed that not only the permanganese that has been formed contributes to the pickling effect, but also the fact that peroxomonphosphoric acid and/or peroxodiphosphoric acid are formed as a result of the oxidative process in the pickling solution, as well as the fact that the manganese occurs in all oxidation stages between +2 and +7. Indicative of this assumption is the changing color of the pickling solution from clear magenta in the starting phase of the electrolytic oxidation over dark red to brown in the further progress of the anodic oxidation process. The substance which makes the solution turn to brown turns out to be a stronger oxidant than permanganese acid when subject to the quantitative analysis by means of ferrometrie with potentiometric indication.

In one embodiment of the inventive pickling solution, phosphoric acid is used in combination with sulphuric acid. The acids were used in a ratio of 80% phosphoric acid to 20% sulphuric acid. The addition of sulphuric acid to phosphoric acid gains to an increase of the electrochemical efficiency, which results in an increased etching effect.

A further embodiment of the inventive pickling solution, an aqueous solution of sulphuric acid was used as inorganic acid. The concentration of the sulphuric acid in this aqueous acidic solution can be within a range of about 800 g/l to about 1400 g/l, with the preferred range of about 1100 g/l. The manganese concentration in the sulphuric acid comprising aqueous solution can be as high as possible, so that the solution is saturated with manganese at the working temperature. For example, in an aqueous solution comprising 1100 g/l $H_2SO_4$ at a temperature of 65° C. about 91 mmol/l can be dissolved. A preferred source for manganese is $MnSO_4*4H_2O$, whereby also manganese salts having a low oxidation state are usable. By the use of sulphuric acid in the inventive pickling solution exhibits a significant increase of the electrochemical efficiency. Furthermore, when sulphuric acid is used as only acid in the inventive pickling solution, the formation of unsoluble Mn(III)-compounds is avoided. This reduces the apparative complexity of the etching system since there is no excessive need for filtration to maintain the electrolyte.

Concerning the process, the object of the invention is solved by a process for pickling plastic surfaces, comprising a step of contacting the plastic surface to be pickled with an acidic treatment solution free of alkali or alkaline earth and including Mn(VII) ions.

In one embodiment of the process according to the invention the contacting of the plastic surface to be pickled with the acidic Mn(VII) ions containing treatment solution which is free of alkali and alkaline earth takes place inside a device formed by an anode space and a cathode space, characterized in that the plastic surface to be pickled is contacted with the acidic Mn(VII) ions containing treatment solution which is free of alkali and alkaline earth inside the anode space or inside a working container which is hydraulically connected to the anode space, wherein the anode space is filled with an acidic solution including a compound which releases Mn ions of a lower oxidation stage and wherein the two electrode spaces are separated from each other by a diaphragm or a membrane correspondingly allowing ions to pass through and wherein the Mn(VII) ions contained in the pickling solution are produced through anodic oxidation by means of applying a suitable voltage.

Conditional on the self-decomposition and particularly on the pickling of the plastic parts a decrease in the permanganese concentration in the pickling solution is caused. Here, the following equations must be taken into account:

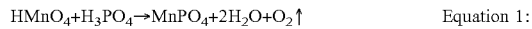  Equation 1:

$$HMnO_4 + H_3PO_4 \rightarrow MnPO_4 + 2H_2O + O_2\uparrow$$

  Equation 2:

$$MnO_4^- + 8H^+ + 5e- \rightarrow Mn^{2+} + 4H_2O$$

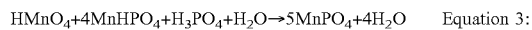  Equation 3:

$$HMnO_4 + 4MnHPO_4 + H_3PO_4 + H_2O \rightarrow 5MnPO_4 + 4H_2O$$

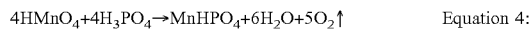  Equation 4:

$$4HMnO_4 + 4H_3PO_4 \rightarrow MnHPO_4 + 6H_2O + 5O_2\uparrow$$

The $Mn^{2+}$ that has been formed can be oxidized. However, the manganese phosphate that has been formed must be separated, because the same may block the anode surface and has a negative influence on the further progress of the coating process. The manganese phosphate that has been separated by filtration or other techniques can be converted by means of an appropriate reducing agent such as oxalic acid, ascorbic acid or also hydrogen peroxide in a stoichiometric or slightly hypostoichiometric amount. Here, the reducing agent is advantageously added as a concentrated solution by means of a dosing pump.

Through the addition of the reducing agent the non-soluble Mn(III) phosphate is changed into soluble $Mn^{2+}$ compounds. The Mn(II) compounds thus obtained can be recirculated as a reactant to the anodic oxidation. As an alternative, the manganese(III) phosphate can also be boiled up in a part of the pickling solution, whereat the non-soluble manganese(III) phosphates are changed into soluble manganese compounds without the addition of further reagent phosphate.

This advantageously provides for a closed material cycle. It has been found out that through the addition of further ions of elements like for instance Ag, Bi, V, Mo or Cu the efficiency of the anodic oxidation could be increased.

EXAMPLE 1

An injection-molded component made of commercially available ABS plastic in galvano quality, e.g. "Novodur P2 MC" by Lanxess company, Leverkusen, is pickled at 60° C. for 10 minutes in a solution of 0.3 mol/L $Mn^{2+}$ ions dissolved in concentrated orthophosphoric acid with $w(H_3PO_4)=0.85$, in which at least 0.025 mol/L of Mn(VII) ions have been anodically produced. By this pickling treatment the surface is chemically etched in such a way that the caverns necessary for the provision of good adhesion are generated. The thus prepared surface can then be metalized following the steps known to one skilled in the art, in a similar way as after the pickling process in a chromium sulfuric acid solution. In this connection, all known metallizing systems come into consideration, of which the colloidal activation, the ionogeneous activation and the direct metallizing systems may be mentioned for example. The deposited layers are free of delaminations and exhibit a good adhesive strength.

EXAMPLE 2

An injection-molded component made of commercially available ABS plastic in galvano quality, e.g. "Novodur P2 MC" by Lanxess company, Leverkusen, is pickled at 50° C. for 10 minutes in a solution of 0.1 mol/L $Mn^{2+}$ ions dissolved in sulfuric acid solution with $\beta(H_2SO_4)=1400$ g/L, in which at least 0.010 mol/L of Mn(VII) ions have been anodically produced. This pickling solution additionally contains 2 mmol/L silver ions which have been added as silver carbonate. By this pickling treatment the surface is chemically etched in such a way that the caverns necessary for the provision of good adhesion are generated. The thus prepared surface can then be metalized following the steps known to one skilled in the art, in a similar way as after the pickling process in a chromium sulfuric acid solution. In this connection, all known metallizing systems come into consideration, of which the colloidal activation, the ionogeneous activation and the direct metallizing systems may be mentioned for example. The deposited layers are free of delaminations and exhibit a good adhesive strength.

EXAMPLE 3

An injection-molded component made of a commercially available ABS/PC blend in galvano quality, e.g. "Bayblend T45" by Lanxess company, Leverkusen, is pickled at 50° C. for 10 minutes in a solution of 0.1 mol/L $Mn^{2+}$ ions dissolved in a sulfuric acid solution with $\beta(H_2SO_4)=1400$ g/L, in which at least 0.010 mol/L of Mn(VII) ions have been anodically produced. This pickling solution additionally contains 2 mmol/L silver ions which have been added as silver carbonate. By this pickling treatment the surface is chemically etched in such a way that the caverns necessary for the provision of good adhesion are generated. The thus prepared surface can then be metalized following the steps known to one skilled in the art, in a similar way as after the pickling process in a chromium sulfuric acid solution. In this connection all known metallizing systems come into consideration, of which the colloidal activation, the ionogeneous activation and the direct metallizing systems may be mentioned for example. The deposited layers are free of delaminations and exhibit a good adhesive strength.

What is claimed is:

1. A process for pickling plastic surfaces comprising:
   a) dispersing a manganese salt in an acid solution in an oxidative cell to produce Mn(VII) ions; and
   b) contacting the plastic surface to be pickled with an acidic treatment solution, the acidic treatment solution comprising the Mn(VII) ions and an inorganic acid, wherein the inorganic acid is at least one acid selected from the group consisting of phosphoric acid, peroxomonophosphoric acid, peroxodiphosphoric acid, sulfuric acid, peroxomonosulfuric acid, and peroxodisulfuric acid;
      wherein the acidic treatment solution is substantially free of chromium ions, alkali ions and alkaline earth ions; and wherein the acid used in the acid solution of the oxidative cell comprises the same acid as the inorganic acid in the acidic treatment solution.

2. The process for pickling ABS plastic surfaces according to claim 1, wherein the acid treatment solution comprises silver ions.

3. The process for pickling ABS plastic surfaces according to claim 1, wherein the acidic treatment solution in the oxidation cell is maintained at a temperature in the range of 20° C. to 90° C.

4. The process for pickling ABS plastic surfaces according to claim 1, further comprising the step of metallizing the pickled ABS plastic surfaces.

5. The process for pickling ABS plastic surfaces according to claim 1, wherein the ABS plastic surfaces comprise an ABS plastic or an ABS plastic blend.

6. A pickling solution for the surface pre-treatment of plastic surfaces in preparation for metallization, the solution comprising:
   a source of Mn(VII) ions;
   an inorganic acid, the inorganic acid comprising 800 g/l to 1400 g/l sulfuric acid;
   wherein the pickling solution is substantially free of chromium (VI) ions, alkali ions, and alkaline-earth ions; and
   wherein the formation of insoluble Mn(III)-compounds is avoided.

7. The pickling solution according to claim 6 wherein the source of Mn(VII) ions provides Mn(VII) ions at a concentration between 0.001 and 0.5 mol/l.

8. The pickling solution according to claim 6 wherein the inorganic acid has a concentration between 1 and 18.5 mol/l.

9. The pickling solution according to claim 6 further comprising ions of one or more elements from the group consisting of Ag, Bi, V, Mo, and Cu.

10. The pickling solution according to claim 9 further comprising silver ions.

11. The pickling solution according to claim 6 comprising between 0.001 and 2.0 mol/l ions of one or more elements from the group consisting of Ag, Bi, V, Mo, and Cu.

12. The pickling solution of claim 6 further comprising a wetting agent.

13. The pickling solution of claim 6 further comprising a defoamer.

14. The pickling solution of claim 6 wherein the Mn(VII) ions are obtained by means of an oxidation cell from a Mn-ion of an oxidation state lower than VII.

15. The pickling solution according to claim 14, wherein the solution for the oxidative production of Mn(VII) ions is an acidic solution.

16. The pickling solution according to claim 14 wherein the solution for the oxidative production of Mn(VII) ions includes as a source of Mn ions of an oxidation stage lower than (VII) at least one manganese compound selected from the group of $MnCO_3$, MnSO4, MnO, $MnCl_2$, $Mn(CH3COO)_2$, $Mn(NO_3)_2$, $Mn_2O_3$, $MnPO_4$, MnO(OH), $Mn(CH_3COO)_3$ and $MnF_3$ and $MnO_2$.

17. The pickling solution according to claim 16 wherein the solution for the oxidative production of Mn(VII) ions includes at least one acid from the group consisting of phosphoric acid, peroxomonophosphoric acid, peroxodiphosphoric acid, sulfuric acid, peroxomonosulfuric acid and peroxodisulfuric acid.

18. A process for pickling plastic surfaces comprising:
   a) providing an oxidation cell comprising an anode space and a cathode space separated from each other by a membrane capable of allowing ions to pass through;
   b) disposing an anolyte in the anode space, the anolyte comprising a concentrated acid and a Mn ion releasing compound;
   c) disposing a catolyte in the cathode space, the catolyte comprising a diluted mineral acid;
   d) applying a current density to galvanically oxidatively form an acidic Mn(VII) containing treatment solution; and
   e) contacting the plastic surface to be pickled with the acidic Mn(VII) containing treatment solution inside the anode space or a working container connected to the anode space;
   wherein the acidic treatment solution is substantially free of chromium ions, alkali ions and alkaline earth ions.

19. The process for pickling ABS plastic surfaces according to claim 15, wherein the acidic treatment solution further comprising ions of one or more elements selected from the group consisting of Ag, Bi, V, Mo, and Cu.

20. The process for pickling ABS plastic surfaces according to claim 18, wherein the acidic treatment solution in the oxidation cell is maintained at a temperature in the range of 20° C. to 90° C.

* * * * *